United States Patent [19]
Nakamura et al.

[11] Patent Number: 5,345,822
[45] Date of Patent: Sep. 13, 1994

[54] VIBRATORY GYROSCOPE HAVING A SUPPORT MEMBER

[75] Inventors: Takeshi Nakamura; Yoshiaki Heinouchi; Yukio Sakashita, all of Nagaokakyo, Japan

[73] Assignee: Murata Manufacturing Co., Ltd., Kyoto, Japan

[21] Appl. No.: 903,317

[22] Filed: Jun. 24, 1992

[30] Foreign Application Priority Data

| Jun. 28, 1991 | [JP] | Japan | 3-185269 |
| Jul. 8, 1991 | [JP] | Japan | 3-194913 |
| Jul. 8, 1991 | [JP] | Japan | 3-194914 |
| Jul. 8, 1991 | [JP] | Japan | 3-194915 |
| Jul. 8, 1991 | [JP] | Japan | 3-194916 |
| Jul. 8, 1991 | [JP] | Japan | 3-194917 |
| Jul. 8, 1991 | [JP] | Japan | 3-194918 |
| Jul. 8, 1991 | [JP] | Japan | 3-194919 |

[51] Int. Cl.⁵ ............................ G01P 15/08
[52] U.S. Cl. ...................... 73/505; 73/497; 310/316
[58] Field of Search .......... 73/505, 497, 493, 431; 310/315, 316, 329

[56] References Cited

U.S. PATENT DOCUMENTS

| 3,316,768 | 5/1967 | Cook . | |
| 4,750,362 | 6/1988 | Pier . | |
| 4,836,023 | 6/1989 | Oikawa | 73/505 |
| 4,854,169 | 8/1989 | Sakuma et al. | 73/431 |
| 4,898,031 | 2/1990 | Oikawa et al. | 73/505 |
| 5,038,613 | 8/1991 | Takenaka et al. | 73/493 |
| 5,130,600 | 7/1992 | Tomita et al. | 310/329 |
| 5,220,833 | 6/1993 | Nakamura | 73/505 |

FOREIGN PATENT DOCUMENTS

| 0368446A | 5/1990 | European Pat. Off. . |
| 0368446A2 | 5/1990 | European Pat. Off. . |
| 0401669A2 | 12/1990 | European Pat. Off. . |
| 2084330A | 4/1982 | United Kingdom . |

Primary Examiner—Hezron E. Williams
Assistant Examiner—Helen C. Kwok
Attorney, Agent, or Firm—Nikaido, Marmelstein, Murray & Oram

[57] ABSTRACT

A vibratory gyroscope includes a vibrator. The vibrator includes a triangular prism-shaped vibrating body. On three side faces of the vibrating body, piezoelectric elements are formed respectively. Supporting members are fixed to ridge-line portions in the vicinity of nodal points of the vibrating body. The supporting members are formed into a multi-layer structure. An elastic material having a large strength is used as inner portions of the supporting members, and a material having a good solderability is used as outer portions of the supporting members. Under the vibrator, a supporting plate is provided as a shield material. Furthermore, a work cover is provided on the side of and above the vibrator as a shield material. The supporting plate and the work cover are formed by a magnetic material such as iron, nickel, stainless steel or the like. In the vicinity of the supporting members, protective members are provided. In the outer vicinity of longitudinal opposite ends of the vibrator, protective members are provided.

14 Claims, 11 Drawing Sheets

F I G. 15
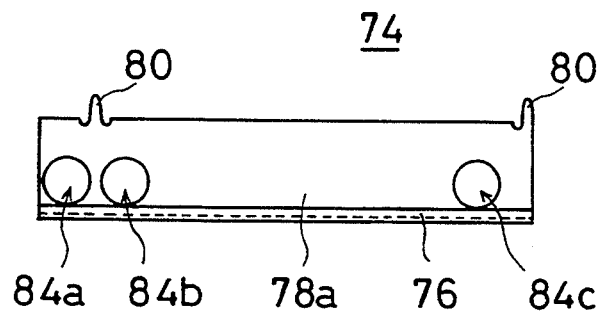
F I G. 16
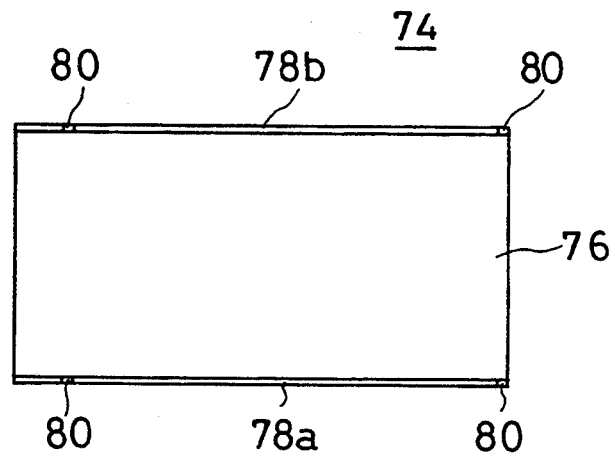
F I G. 17
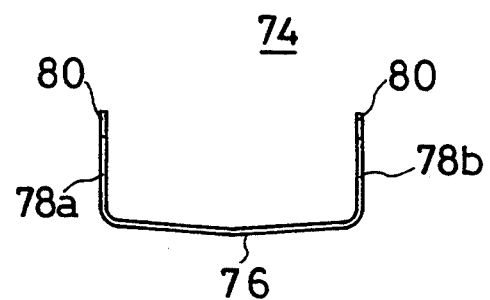

VIBRATORY GYROSCOPE HAVING A SUPPORT MEMBER

BACKGROUND OF THE INVENTION

1. Field of the Invention

The present invention relates to a vibratory gyroscope, and particularly to a vibratory gyroscope which is capable of measuring a rotational angular velocity by utilizing, for example, a bending and vibration mode, and is used, for example, in a navigation system installed in an automobile.

2. Description of the Prior Art

FIG. 24 is a perspective view showing an example of a conventional vibratory gyroscope which is a background of the present invention, and FIG. 25 is a circuit diagram thereof. The vibratory gyroscope 1 comprises a vibrator 2. The vibrator 2 includes a triangular prism-shaped vibrating body 3, on three side faces of the vibrating body 3, piezoelectric elements 4a, 4b and 4c are formed respectively. Supporting members 5a and 5b, consisting of a material such as nickel or the like, are fixed to ridge-line portions of the vibrating body 3. The supporting members 5a and 5b are fixed to the vicinity of nodal points of the vibrating body 3 by means of soldering, welding or the like. Furthermore, the supporting members 5a and 5b are fixed to a board 6 by means of soldering or the like. The supporting members 5a and 5b support the vibrating body 3 above the board 6 in a vibratory fashion and also serve as wires for grounding.

Meanwhile, one piezoelectric element 4c of the vibrator 2 is electrically connected to an input terminal of an oscillation circuit 7, output terminals of the oscillation circuit 7 are electrically connected to the other two piezoelectric elements 4a and 4b. Thus, the vibrator 2 makes self-oscillation drive. The two piezoelectric elements 4a and 4b are also electrically connected respectively to two input terminals of a detection circuit 8 consisting of, for example, a differential amplifier.

In the vibratory gyroscope 1, by applying a driving signal to the piezoelectric elements 4a and 4b, the vibrating body 3 bends and vibrates. When the vibratory gyroscope 1 is rotated about an axial direction of the vibrating body 3, voltages are generated in the piezoelectric elements 4a and 4b responsive thereto. And hence, by measuring the voltages generated in the piezoelectric elements 4a and 4b, a rotational angular velocity can be detected. Thus, the rotational angular velocity of the vibratory gyroscope 1 is detected by an output of the detection circuit 8.

In such a conventional vibratory gyroscope, the supporting members are designed to support the vibrating body and to serve as the wires for grounding. Hence, as a conductive substance having a solderability and a weldability, a metal wire such as nickel is used. However, nickel or the like is relatively mild, thus when a thin wire material is used, the mechanical strength thereof is weakened. When a thick wire material is used as the supporting members, the vibration of the vibrating body may leak, or an outside vibration is transmitted through the supporting members, thereby deteriorating characteristics stability.

Therefore, it is considered to manufacture the supporting members with a material having a large strength such as molybdenum. However, such material is difficult to be soldered or welded and can not support the vibrating body.

In such conventional vibratory gyroscope, the vibrator is susceptible to an outside magnetism and its characteristics is deteriorated by the outside magnetism.

Furthermore, in such a conventional vibratory gyroscope, when a large inertial force is exerted on the vibrator, sometimes the supporting members for supporting the vibrator are exposed to plastic deformation, thus in such a case characteristics are deteriorated.

SUMMARY OF THE INVENTION

It is therefore a primary object of the present invention to provide a vibratory gyroscope which is capable of supporting a vibrating body reliably and has stable characteristics.

A vibratory gyroscope according to the present invention comprises a prism-shaped vibrating body, a plurality of piezoelectric elements formed on side faces of the vibrating body, and a supporting member having a multi-layer structure and fixed to the vicinity of nodal point of the vibrating body, wherein an inner portion of the supporting member being formed by an elastic material having a large strength, and an outer portion thereof being formed by a material having a good solderability.

In the vibratory gyroscope according to the present invention, by using the material having the good solderability as the outer portion of the supporting member, the supporting member can be soldered to the vibrating body and a board. Furthermore, by using the elastic material having the large strength as the inner portion of the supporting member, the supporting member can support the vibrating body even when the supporting member is made thinner. Besides, since the supporting member is deformed elastically, the vibration of the vibrating body is not hindered.

Since the vibrating body can be supported by such thin supporting member, the vibration of the vibrating body never leaks from the supporting member, nor the outside vibration is transmitted to the vibrating body through the supporting member. Besides, the supporting member itself will never hinder the vibration of the vibrating body. Thus, characteristics of the vibratory gyroscope can be stabilized. Meanwhile, since the supporting member can be fixed to the vibrating body and the board, the vibrating body can be supported above the board reliably.

It is another object of the present invention to provide a vibratory gyroscope, wherein deterioration of characteristics by an outside magnetism can be prevented.

An another vibratory gyroscope according to the present invention comprises a vibrator, and a shield member consisting of a magnetic material and provided around the vibrator.

In the another vibratory gyroscope according to the present invention, the vibrator is magnetically shielded from the outside by the shield material.

Hence, characteristic deterioration of the vibratory gyroscope due to the outside magnetism can be prevented.

In the another vibratory gyroscope according to the present invention, a heater may be provided in the vicinity of the vibrator. When the heater is provided in the vicinity of the vibrator as such, the temperature of the vibrator is kept stable by the heater. Hence, characteristic deterioration of the vibratory gyroscope due to the outside temperature change is restrained.

Meanwhile, in the another vibratory gyroscope according to the present invention, a material which acts as a cushion may be provided around the vibrator. When the cushion material is provided around the vibrator as such, the vibrator is adiabatically isolated from the outside by the cushion material. Besides, an unnecessary sound wave to the vibrator from the outside is absorbed by the cushion material. Hence, characteristics of the vibratory gyroscope is stabilized against the outside temperature change and sound wave.

In the another vibratory gyroscope according to the present invention, an oscillation circuit for driving the vibrator may be provided, and further, a shield cover consisting of a magnetic material may be disposed so as to cover the oscillation circuit. When the shield cover is disposed so as to cover the oscillation circuit as such, a high frequency noise generated from the oscillation circuit can be prevented by the shield cover. Hence, the high frequency noise generated from the oscillation circuit can be prevented, and characteristics of the vibratory gyroscope is stabilized.

In the another vibratory gyroscope according to the present invention, a shield cover which serves as a ground potential, and a back cover which is electrically connected to the shield cover may be provided. At least, one of the shield cover and the back cover may be formed with an elastic material, and the back cover may be pressed onto the shield cover against its elastic force. When the back cover is pressed onto the shield cover which serves as the ground potential as such, the shield cover and the back cover are electrically connected. Hence, the vibratory gyroscope can be connected to the outside ground potential easily. Meanwhile, the back cover may be electrically connected to the shield cover simply by just pressing the back cover onto the shield cover.

It is still another object of the present invention to provide a vibratory gyroscope, wherein a supporting member for supporting a vibrator is hardly exposed to plastic deformation.

A third vibratory gyroscope according to the present invention comprises a vibrator, a supporting member for supporting the vibrator, and a protective member provided in the vicinity of, at least, one of the vibrator and the supporting member.

In the third vibratory gyroscope according to the present invention, the supporting member is not displaced unnecessarily by the protective member, thereby the supporting member for supporting the vibrator is hardly exposed to plastic deformation.

Hence, in the third vibratory gyroscope according to the present invention, characteristic deterioration due to plastic deformation of the supporting member is hardly occurred.

In the third vibratory gyroscope according to the present invention, the vibrator may be disposed on one side of a circuit board, and an oscillation circuit for driving the vibrator and an detection circuit for detecting the vibrator displacement may be disposed on the other side of the circuit board, and further, an intermediate board having terminals which extend through the circuit board may be disposed. The vibrator, the oscillation circuit and the detection circuit may be electrically connected through the terminals of the intermediate board. As such, when the vibrator, the oscillation circuit and the detection circuit are electrically connected through the terminals of the intermediate board, a lead wire is not needed to be stretched from one side to the other side of the circuit board.

The above and other objects, features, aspects and advantages of the present invention will become more apparent from the following detailed description of the embodiments with reference to the accompanying drawings.

BRIEF DESCRIPTION OF THE DRAWINGS

FIG. 15 is a front view of a shield cover used in the vibratory gyroscope shown in FIG. 1.

FIG. 16 is a plan view of the shield cover shown in FIG. 15.

FIG. 17 is a side view of the shield cover shown in FIG. 15.

DESCRIPTION OF THE PREFERRED EMBODIMENTS

Figure 1:
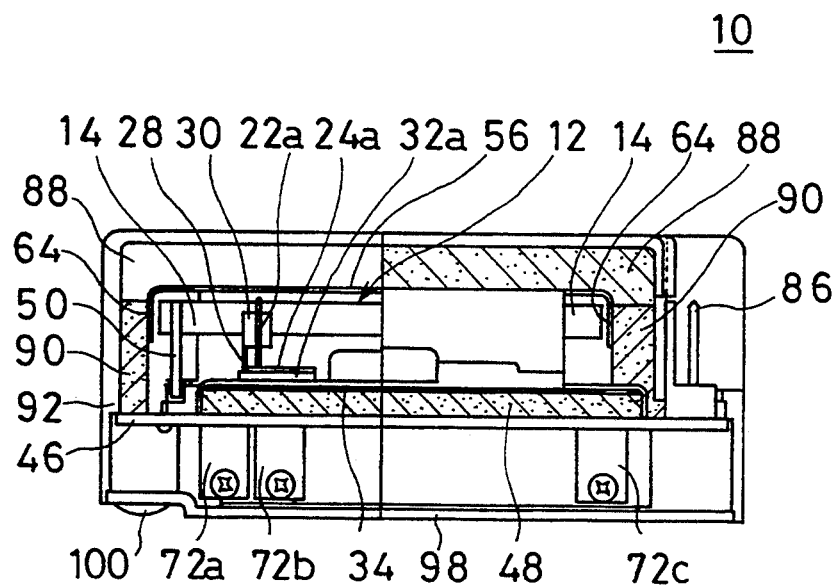
FIG. 1 is a front illustrative view showing one embodiment of the present invention.
Figure 2:
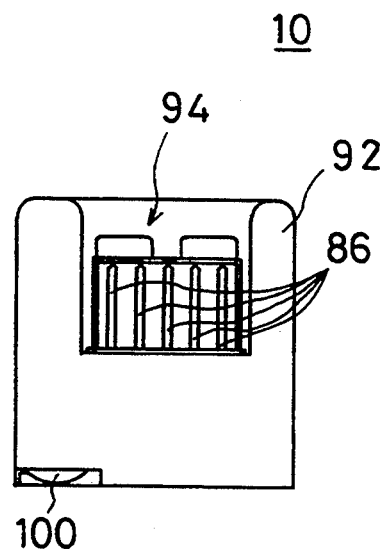
FIG. 2 is a side illustrative view of a vibratory gyroscope shown in FIG. 1.
Figure 3:
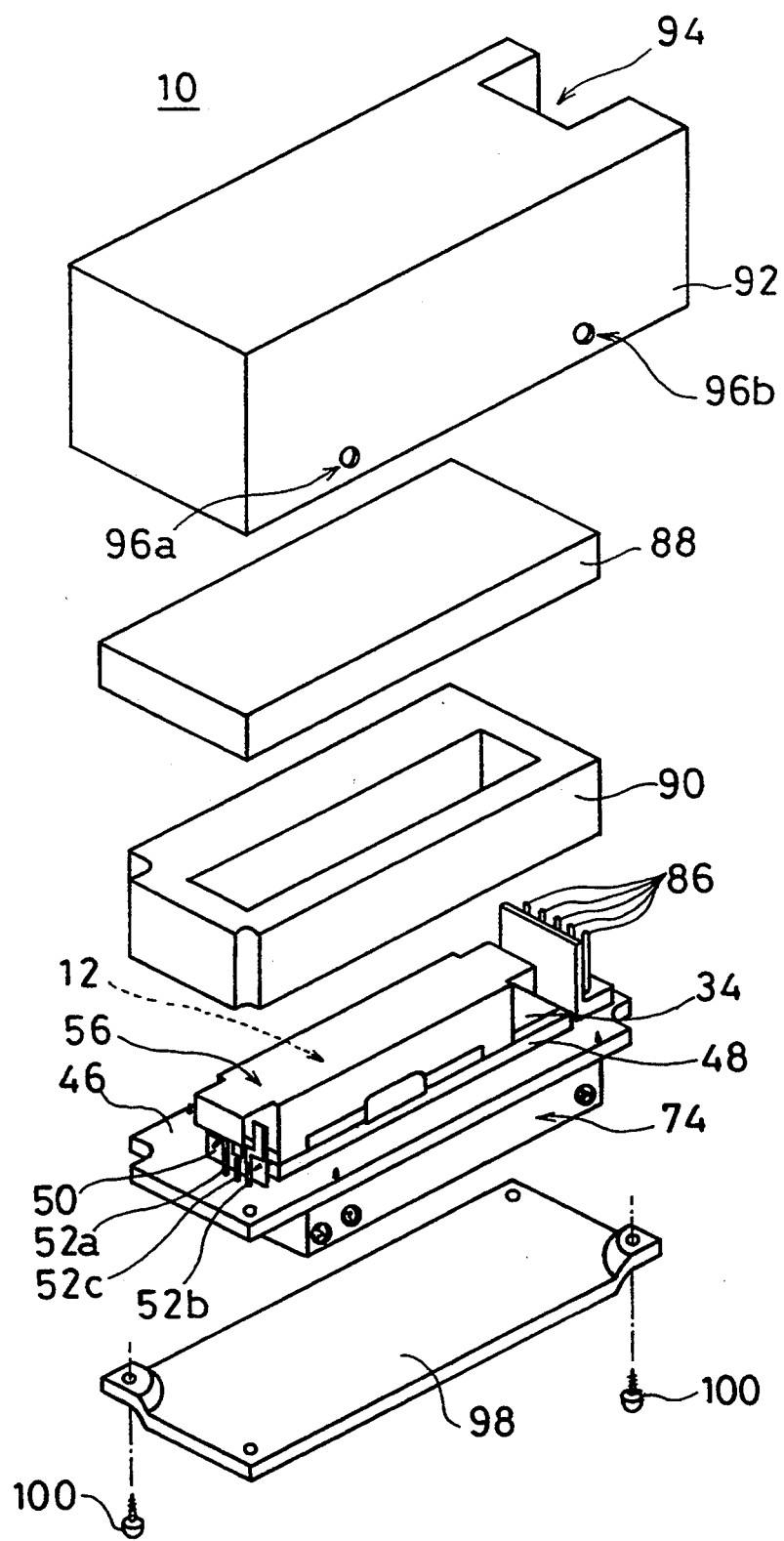
FIG. 3 is an exploded view of the vibratory gyroscope shown in FIG. 1.
Figure 4:
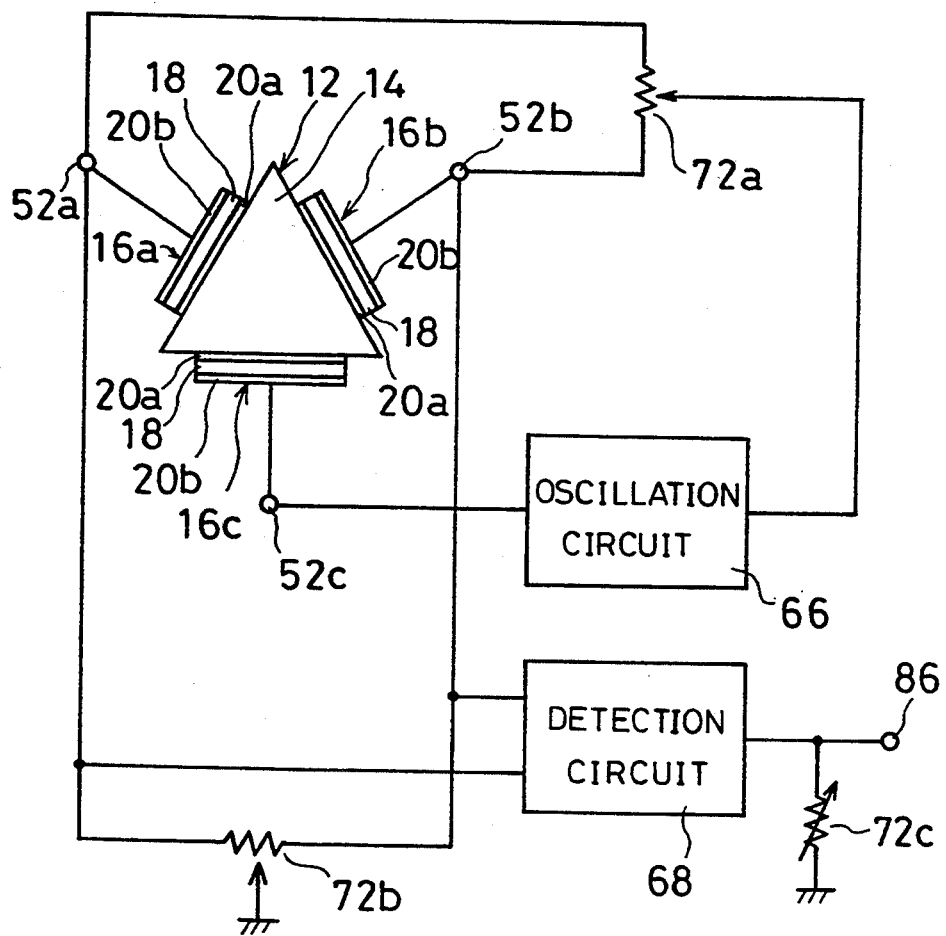
FIG. 4 is a circuit diagram of the vibratory gyroscope shown in FIG. 1.
Figure 5:
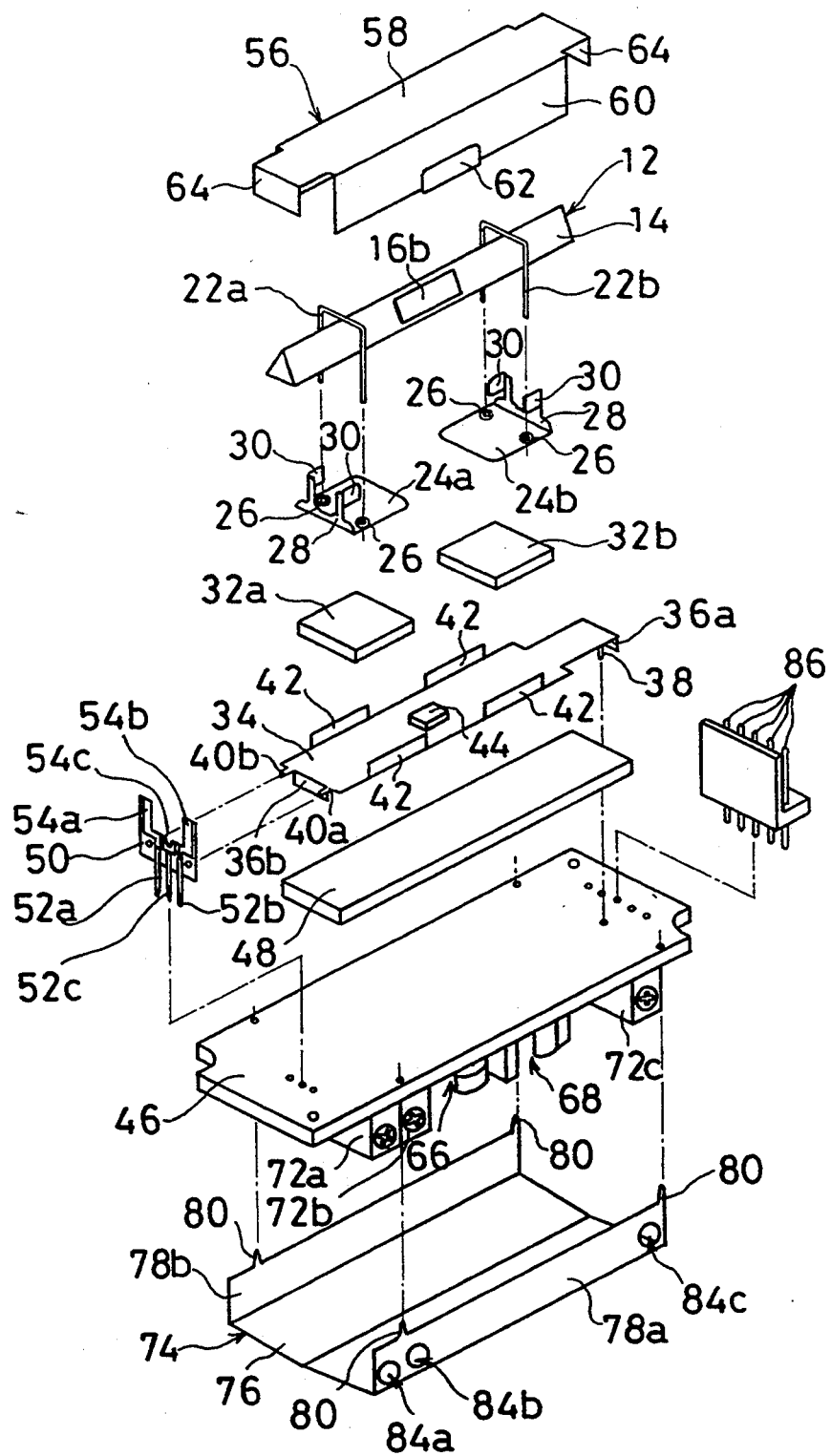
FIG. 5 is an exploded view showing an essential portion of the vibratory gyroscope shown in FIG. 1.

FIG. 1 is a front illustrative view showing one embodiment of the present invention, and FIG. 2 is a side illustrative view thereof. FIG. 3 is an exploded view of a vibratory gyroscope shown in FIG. 1. FIG. 4 is a circuit diagram of the vibratory gyroscope shown in FIG. 1. FIG. 5 is an exploded view showing an essential portion of the vibratory gyroscope shown in FIG. 1.

The vibratory gyroscope 10 comprises a vibrator 12. The vibrator 12 includes, for example, a regular triangular prism-shaped vibrating body 14 as particularly shown in FIG. 5. The vibrating body 14 is formed with a constant elastic metal material such as nickel, iron, chromium, titanium or their alloys such as elinver, Fe-Ni alloy. The vibrating body 14 may be formed with a material which generally generates a mechanical vibration such as quartz, glass, crystal, ceramics besides metal.

In the vibrating body 14, as particularly shown in FIG. 4, piezoelectric elements 16a, 16b and 16c are respectively secured to the center portions of its three side faces. The piezoelectric elements 16a–16c respectively include piezoelectric layers 18 consisting of, for example, ceramics, and on both surfaces of the piezoelectric layers 18, electrodes 20a and 20b are formed respectively. The electrodes 20a on one surface of the piezoelectric elements 16a–16c are bonded to the side faces of the vibrating body 14 by means of, for example, a conductive adhesive. In the embodiment, the two piezoelectric elements 16a and 16b are used for vibrating and driving the vibrating body 14 and for detecting displacement of the vibrating body 14, and the other piezoelectric element 16c is used for feeding back the driving signal to the two piezoelectric elements 16a and 16b.

The vibrator 12 is, as particularly shown in FIG. 5, supported by two U-shaped supporting members 22a and 22b.

Figure 6:
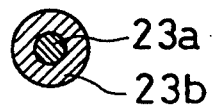
FIG. 6 is a sectional view of a supporting member used in the vibratory gyroscope shown in FIG. 1.

The supporting members 22a and 22b are, as shown in FIG. 6, respectively formed into a double-layer structure having a circular section. In this case, taking into account of strength of the supporting members and the solderability and weldability of the supporting members to the vibrating body, as a material of inner portions 23a of the supporting members 22a and 22b, an elastic material having a large strength such as molybdenum, tungsten, titanium or the like is used, and as a material of outer portions 23b thereof, a material having a good solderability and weldability such as nickel, platinum, gold, silver, copper, stainless steel, iron or the like is used. When strength of the supporting members and the solderability and weldability of the supporting members to the vibrating body are not taken into account simultaneously, the supporting members may be formed by a single material.

Center portions of the supporting members 22a and 22b are secured to ridge-line portions of the vibrating body 14 between the two piezoelectric elements 16a and 16b. In this case, the supporting members 22a and 22b are secured to the vicinity of nodal points of the vibrating body 14 so as not to affect negatively on the vibration of the vibrating body 14. In this embodiment, the supporting members 22a and 22b are secured to the positions of 0.224L from opposite ends of the vibrating body 14, where L represents the length of vibrating body 14. In this case, the supporting members 22a and 22b are, for example, soldered or welded to the vibrating body 14. The supporting members 22a and 22b may be bonded and secured to the vibrating body 14 by means of an adhesive.

Figure 7:
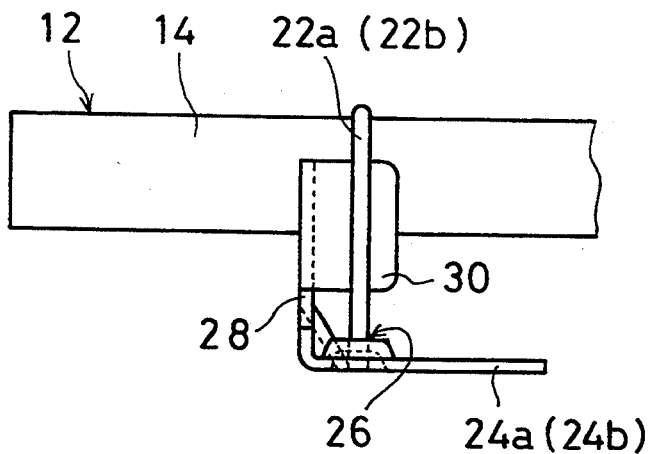
FIG. 7 is a front illustrative view showing a structure for supporting a vibrator of the vibratory gyroscope shown in FIG. 1.
Figure 8:
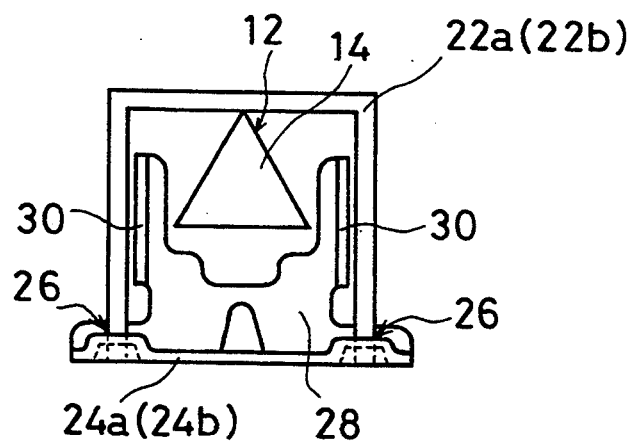
FIG. 8 is a side illustrative view showing a structure for supporting the vibrator of the vibratory gyroscope shown in FIG. 1.
Figure 9:
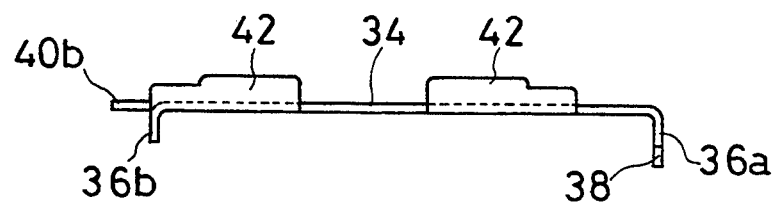
FIG. 9 is a front view of a supporting plate used in the vibratory gyroscope shown in FIG. 1.
Figure 10:
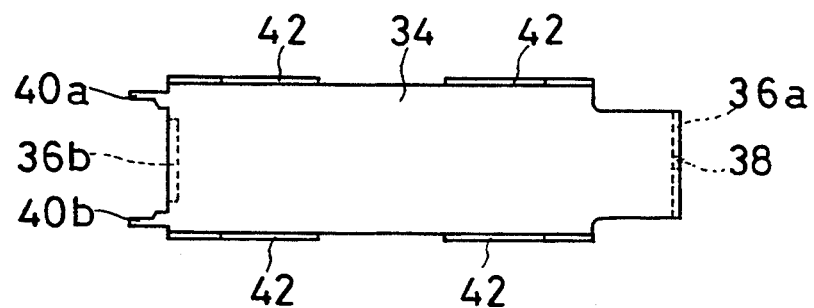
FIG. 10 is a plan view of the supporting plate shown in FIG. 9.
Figure 11:
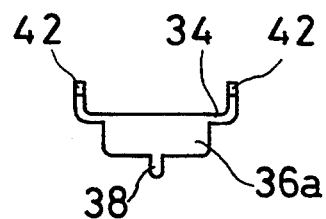
FIG. 11 is a side view of the supporting plate shown in FIG. 9.
Figure 12:
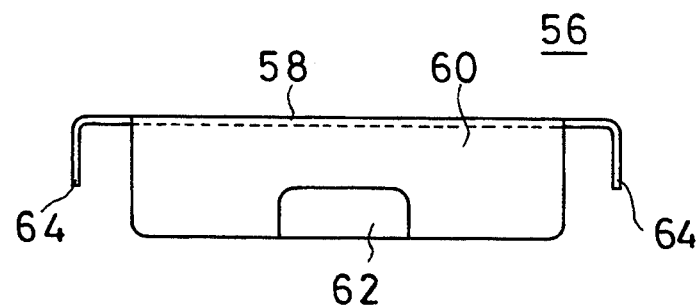
FIG. 12 is a front view of a work cover used in the vibratory gyroscope shown in FIG. 1.
Figure 13:
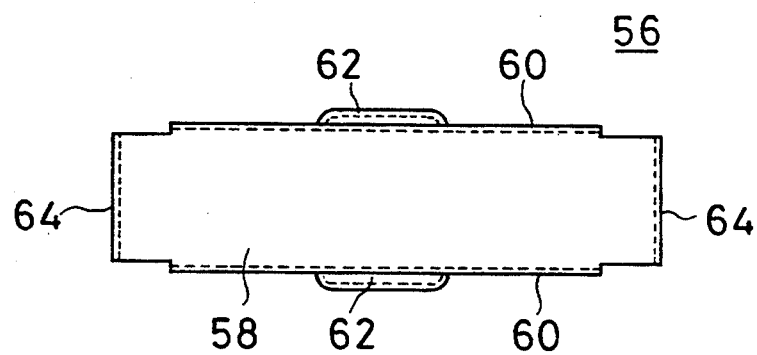
FIG. 13 is a plan view of the work cover shown in FIG. 12.
Figure 14:
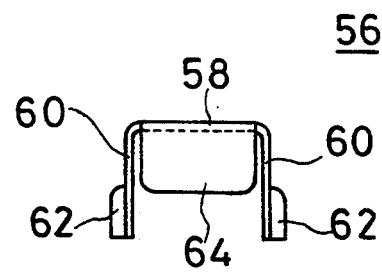
FIG. 14 is a side view of the work cover shown in FIG. 12.

Both end portions of the supporting members 22a and 22b are, as shown in FIG. 5, FIG. 7 and FIG. 8, respectively secured to substantially rectangular stationary plates 24a and 24b consisting of a metal material such as iron, nickel, stainless steel or the like. That is, two holes 26 are respectively formed in the stationary plates 24a and 24b. The both end portions of one supporting member 22a are inserted through the two holes 26 of one stationary plate 24a and soldered thereto. Similarly, the both end portions of the other supporting member 22b are inserted through the two holes 26 of the other stationary plate 24b and soldered thereto.

At ends of the stationary plates 24a and 24b, for example, substantially U-shaped piece members 28 are formed respectively so as not to touch the vibrator 12. On lateral opposite ends of the piece members 28, for example, plate-shaped protective members 30 are formed respectively. The protective members 30 are designed to protect the supporting members 22a and 22b by not allowing the supporting members 22a and 22b to displace in a lateral direction of the vibrator 12 unnecessarily, and are disposed in the vicinity of the supporting members 22a and 22b, for example, inner sides of the supporting members 22a and 22b. The piece members 28 and the protective members 30 are formed integrally with the stationary plates 24a and 24b.

The stationary plates 24a and 24b are, as shown in FIG. 1 and FIG. 5, respectively secured to, for example, one surface of a flat-shaped supporting plate 34 consisting of a magnetic material and conductivity such as iron, nickel, stainless steel or the like, for example, by buffer materials 32a and 32b.

On the supporting plate 34, as shown in FIG. 5, FIG. 9, FIG. 10 and FIG. 11, leg members 36a and 36b which extend downward from one end and the other end in its longitudinal direction are formed. On the leg member 36a at one end side in the longitudinal direction of the supporting plate 34, a projection 38 is formed at its lower end center. Meanwhile, on both sides at the other end in the longitudinal direction of the supporting plate 34, two projections 40a and 40b are formed. The projections 38, 40a and 40b are used for securing the supporting plate 34 to a circuit board 46 to be described later.

On the supporting plate 34, two hold pieces 42 are formed at a predetermined distance at one end in its lateral direction, and at the other end in its lateral direction, two hold pieces 42 are formed at a predetermined distance. The hold pieces 42 are used for holding a work cover 56 to be described later by the supporting plate 34.

To the center of one surface of the supporting plate 34, as particularly shown in FIG. 5, a PTC (positive temperature coefficient) element 44 is fixed. The PTC element 44 is designed to keep the temperature of the vibrator 12 stable. That is, a fixed voltage is applied to the PTC element 44. When the temperature of the vibrator 12 or the peripheral temperature of the PTC element 44 rises, a resistance of the PTC element 44 increases and a calorific value therefrom is reduced to lower the peripheral temperature, on the contrary, when the peripheral temperature is low, the resistance in the PTC element reduces and the calorific value therefrom is increased to raise the peripheral temperature. Thus, the temperature of the vibrator 12 is kept stable by the PTC element 44.

The supporting plate 34 is fixed to one surface side of the circuit board 46 as shown in FIG. 3 and FIG. 5. In this case, the projection 38 of the leg member 36a on one end side of the supporting plate 34 is inserted through the circuit board 46, and soldered to a ground pattern (not shown) on the other surface of the circuit board 46. Hence, the supporting plate 34 is secured to the circuit board 46 in the floating state from one surface of the circuit board 46 by the two leg members 36a and 36b.

Between the supporting plate 34 and the circuit board 46, a sheet-shaped material 48 which acts as a cushion is bonded to the center of one surface of the circuit board 46 by means of an adhesive. The cushion material 48 is formed with a material consisting of rubber such as butyl rubber or a synthetic resin such as urethane, which is foamed such that respective cells of the foam do not cohere to each other or foamed into closed cells.

Meanwhile, on one surface of the circuit board 46, for example, a U-shaped intermediate board 50 is fixed out of the other end in the longitudinal direction of the supporting plate 34. To the intermediate board 50, three terminals 52a, 52b and 52c which are in parallel to its surface and extend outwardly are formed in parallel to each other. The terminals 52a–52c are extended through the circuit board 46 and respectively soldered to three conductive patterns (not shown) on the other surface of the circuit board 46. Thus, the intermediate board 50 is secured to the circuit board 46 such that, its one surface faces the end face of the other end side in the longitudinal direction of the supporting plate 34.

The two projections 40a and 40b of the supporting plate 34 are inserted through the intermediate board 50 and soldered to a conductive pattern (not shown) on the other surface of the intermediate plate 50. Thus, the supporting plate 34 is further secured tightly to the circuit board 46 via the intermediate board 50.

Furthermore, the other surface of the intermediate board 50, three conductive patterns 54a, 54b and 54c are formed, and the three terminals 52a–52c are electrically connected respectively to the conductive patterns 54a–54c. To the conductive patterns 54a–54c, the electrodes 20b on the other surface of the three piezoelectric elements 16a–16c of the vibrator 12 are electrically connected respectively by means of lead wires (not shown).

The work cover 56 consisting of a material having a and a conductivity such as iron, nickel, stainless steel or the like is installed to the supporting plate 34 so as to cover the vibrator 12, the intermediate board 50 and so on.

The work cover 56 includes a flat-shaped surface member 58 as shown in FIG. 5, FIG. 12, FIG. 13 and FIG. 14, and on the surface member 58, side members 60 which extend downward from its lateral ends are formed respectively. Lower end center portions of the side members 60 are formed as projections 62 which project outwardly. For example, protective members 64 having an L-shaped section are respectively formed at longitudinal ends on the surface member 58. The work cover 56 is placed in such a manner that, its side members 60 are engaged to the inner side of the hold pieces 42 of the supporting plate 34, and the projections 62 of the side members 60 are engaged between the hold pieces 42, 42. In this case, the two protective members 64 are disposed in the vicinity of the outer opposite ends in the longitudinal direction of the vibrator 12. The protective members 64 are designed to protect the supporting members 22a and 22b, by not allowing the vibrator 12 to displace in its longitudinal direction unnecessarily, or by not allowing the supporting members 22a and 22b to displace in the longitudinal direction of the vibrator 12 unnecessarily.

Meanwhile, as shown in FIG. 5, an oscillation circuit 66 and a detection circuit 68 are mounted on the other surface of the circuit board 46.

The oscillation circuit 66 is for driving and vibrating the vibrator 12, and includes a crystal for stabilizing the oscillation frequency and a phase correcting circuit for adjusting the oscillation frequency. An input terminal of the oscillation circuit 66 is, as particularly shown in FIG. 4, electrically connected to the electrode 20b of the piezoelectric element 16c of the vibrator 12 via the conductive pattern (not shown), the terminal 52c of the intermediate board 50 and so on, and an output terminal of the oscillation circuit 66 is divided by a variable resistor 72a and are respectively connected to the electrodes 20b of the piezoelectric elements 16a and 16b via the other conductive pattern (not shown), the terminals 52a, 52b and so on.

The detection circuit 68 is for detecting displacement of the vibrator 12 and is consisting of, for example, a differential amplifier or the like. Two input terminals of the detection circuit 68 are respectively connected to the electrodes 20b of the piezoelectric elements 16a and 16b via the conductive pattern (not shown), the terminals 52a, 52b and so on.

Meanwhile, on the other surface of the circuit board 46, as shown in FIG. 5, three variable resistors 72a, 72b and 72c are mounted.

One variable resistor 72a is designed to distribute an output of the oscillation circuit equally to the piezoelectric elements 16a and 16b. Another variable resistor 72b is designed to adjust an input signal level input to the detection circuit 68 and, as shown in FIG. 4, is connected between the two input terminals of the detection circuit 68 . Furthermore, the third variable resistor 72c is designed to adjust an output signal level of the detection circuit 68, and is connected between the output terminal of the detection circuit 68 and a grounding.

Meanwhile, to the other surface of the circuit board 46, as shown in FIG. 3 and FIG. 5, a shield cover 74 consisting of a material having a magnetism, conductivity and elasticity such as iron, nickel, stainless steel or the like is installed so as to cover the oscillation circuit 66, the detection circuit 68, the variable resistors 72a, 72b, 72c and so on.

The shield cover 74 includes a rectangular plate-shaped surface member 76 having a substantially same width as the circuit board 46 as shown in FIG. 5, FIG. 15, FIG. 16 and FIG. 17. The surface member 76 has its center portion in the lateral direction bent outwardly. On opposite ends in the lateral direction of the surface member 76, side members 78a and 78b are formed respectively. Furthermore, on opposite end portions of the side members 78a and 78b, projections 80 are formed respectively. The projections 80 are inserted through the circuit board 46 and soldered to a ground pattern (not shown) on one surface of the circuit board 46.

In the side member 78a of the shield cover 74, three holes 84a, 84b and 84c associated with adjusting screws of the three variable resistors 72a–72c are formed.

On one surface of the circuit board 46, a plurality of terminals 86 such as a power terminal for supplying an electric power to the oscillation circuit 66 and the detection circuit 68, and an output terminal for taking out the output signal of the detection circuit 68 are formed upward, the terminals 86 are connected to the PTC element 44, the oscillation circuit 66 and detection circuit 68 via the conductive pattern (not shown) of the circuit board 46 and so on.

The vibrator 12, the circuit board 46, the work cover 56 and so on are contained in a box case 92 together with two cushion materials 88 and 90 as shown in FIG. 1 and FIG. 3.

The cushion material 88 is formed into, for example, a rectangular plate shape, and disposed on the upper face of the work cover 56. A hole associated with the work cover 56 is formed at the center of the cushion material 90. The cushion material 90 is disposed on the side of the work cover 56. The cushion materials 88 and 90 are formed with a material consisting of rubber, such as butyl rubber or a synthetic resin such as urethane, which is foamed such that respective cells of the foam do not cohere to each other, the same as the aforementioned cushion material 48. The cushion materials 48, 88 and 90 are designed to enhance a heat shield between the circumference of the vibrator 12 and the outside to absorb an unnecessary sound wave from the outside to the vibrator 12 and to prevent the leakage of vibration from the vibrator 12 to the outside.

In the case 92, an opening portion 94 associated with the terminals 86 is formed, and as particularly shown in FIG. 2, the terminals 86 are exposed out of the case 92.

Furthermore, in the case 92, associating to the adjusting screws of the variable resistors 72a and 72c, two holes 96a and 96b for adjusting the screws from the outside are formed.

To the case 92, as shown in FIG. 1, FIG. 2 and FIG. 3, a rectangular plate-shaped back cover 98 consisting of a conductor such as aluminum or the like is fixed by means of screws 100. In this case, since the lateral center portion of the surface member 76 of the shield cover 74 having an elasticity is bent outwardly, the back cover 98 is pressed onto the shield cover 74 against its elastic force and is electrically connected to the shield cover 74.

In the vibratory gyroscope 10, a driving signal is applied to the piezoelectric elements 16a and 16b by the oscillation circuit 66, thereby the vibrating body 14 bends and vibrates. In this case, the vibrating body 14 bends and vibrates in a direction orthogonal to the face whereon the piezoelectric element 16c is formed. When rotating about an axial direction of the vibrating body 14 in this state, the vibrating direction is changed by the Coriolis force. Voltages are generated in the piezoelectric elements 16a and 16b responsive thereto. Thus, when the difference in voltages of the piezoelectric elements 16a and 16b, or the output of the detection circuit 68 is measured, a rotational angular velocity applied to the vibratory gyroscope 10 can be measured.

In the vibratory gyroscope 10, since an elastic material having a large strength is used as a material of the inner portions 23a of the supporting members 22a and 22b having the multi-layer structure, the supporting members 22a and 22b can be made finer. Thus, the vibration of the vibrating body 14 hardly leaks from the supporting members 22a and 22b, or an outside vibration is hardly transmitted to the vibrating body 14 through the supporting members 22a and 22b. Since the material of the inner portions 23a of the supporting members 22a and 22b is subjected to elastic deformation, it does not hinder the vibration of the vibrating body 14. And hence, the vibrating state as well as characteristics of the vibratory gyroscope 10 are stabilized.

Furthermore, since a material having a good solderability and weldability is used as a material of the outer portions 23b of the supporting members 22a and 22b, connection to the vibrating body 14 and connection to the stationary plates 24a and 24b are effected reliably by means of soldering or welding.

Figure 18:
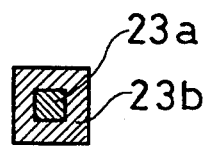
FIG. 18 is a sectional view showing a modified example of the supporting member shown in FIG. 6.
Figure 19:
FIG. 19 is a sectional view showing another modified example of the supporting member shown in FIG. 6.
Figure 20:
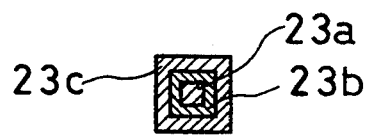
FIG. 20 is a sectional view showing a modified example of the supporting member shown in FIG. 19.
Figure 21:
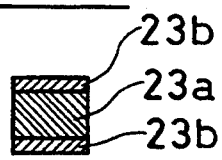
FIG. 21 is a sectional view showing still another modified example of the supporting member shown in FIG. 6.

As shown in FIG. 18, the supporting members 22a and 22b may be formed into the other shape such as a quadrangular sectional shape. Even in such shape, when the elastic material having a large strength is used in the inner portion 23a and the material having a good solderability and weldability is used in the outer portion 23b, the same effect can be obtained. Meanwhile, as shown in FIG. 19 and FIG. 20, the supporting members 22a and 22b may be constructed in a multi-layer structure such as a three-layer structure. In this case, for example, the elastic material having a large strength such as molybdenum may be used in the inner portion 23a, and the metal material such as nickel is used in the outer portion 23b, and further, a solder layer may be formed as an outermost layer 23c. The outer portion 23b of the supporting members 22a and 22b may not necessarily by formed around the inner portion 23a, it may be formed partially at a necessary portion only such as opposing surfaces of the inner portion 23a as shown in FIG. 21. As such, the shape and multi-layer structure of the supporting members 22a and 22b can be changed freely responsive to the purposes.

In the vibratory gyroscope 10 of the embodiment, though the supporting members 22a and 22b are bent in opposite directions with each other in a longitudinal direction of the vibrating body 14, at the same time, the stationary plates 24a and 24b are displaced separately. Hence, the supporting members 22a and 22b do not interfere one another, thus the vibration of the vibrating body 14 is not suppressed by the supporting members 22a and 22b. Thus, a stable vibration attitude of the vibrating body 14 can be secured.

Furthermore, in the vibratory gyroscope 10, since the protective members 30 are provided in the inner vicinity of the supporting members 22a and 22b for supporting the vibrator 12, the supporting members 22a and 22b are not displaced unnecessarily in a lateral direction of the vibrator 12, and hardly caused to plastic deformation. Hence, characteristic deterioration due to the plastic deformation of the supporting members 22a and 22b is prevented. Furthermore, since the supporting members 22a and 22b are not displaced unnecessarily in the longitudinal direction of the vibrator 12, by the protective members 64 of the work cover 56 which are disposed in the outer vicinity of longitudinal opposite ends of the vibrator 12, the characteristic deterioration due to the plastic deformation of the supporting members 22a and 22b is prevented.

In order to prevent the characteristic deterioration due to the plastic deformation of the supporting members 22a and 22b, the protective members may be provided in the vicinity of the vibrator 12 or the supporting members 22a and 22b, and a shape of the protective member is not limited to a plate but may be formed into a block.

In the vibratory gyroscope 10, since the cushion materials, 48, 88 and 90, consisting of the material which has closed cells, are disposed around the vibrator 12, the heat shield between the circumference of the vibrator 12 and the outside is good, and an unnecessary sound wave to the vibrator 12 from the outside can be absorbed, and further, the vibration leakage from the vibrator 12 to the outside can be prevented. Hence, the characteristic deterioration due to the outside temperature change and the sound wave from the outside can be prevented, and at the same time, the vibration leakage from the vibrator 12 to an external device can be prevented.

Meanwhile, in the vibratory gyroscope 10, since the PTC element 44 is provided in the vicinity of the vibrator 12, the temperature of the vibrator 12 can be kept stable. Hence, characteristic deterioration due to the temperature change can be restrained. In order to keep the temperature of the vibrator 12 stable, the other heater such as an NTC (negative temperature coefficient) element, a Nichrome (trademark) wire, a ceramic heater or the like may be disposed in the vicinity of the vibrator 12 in place of the PTC element 44, and further, a temperature detecting means such as a bimetal for detecting peripheral temperature of the vibrator 12 may be disposed to switch on and off the heater based upon the detection by the temperature detecting means.

In the vibratory gyroscope 10, since the supporting plate 34 and the work cover 56 are disposed around the vibrator 12 as shield materials consisting of a magnetic material, the vibrator 12 is magnetically shielded from the outside, and characteristic deterioration due to the outside magnetism can be prevented.

Furthermore, in the vibratory gyroscope 10, since the vibrator 12 provided on one side of the circuit board 46 is electrically connected to the oscillation circuit 66 and the detection circuit 68 on the other side of the circuit board 46 via the terminals 52a–52c of the intermediate board 50, it is not necessary to stretch a lead wire from one side to the other side of the circuit board 46.

In the vibratory gyroscope 10, since the shield cover 74 consisting of a magnetic material is provided so as to cover the oscillation circuit 66 and so on, a high-frequency noise generated from the oscillation circuit 66 can be prevented.

Furthermore, in the vibratory gyroscope 10, since the back cover 98 is electrically connected to the shield cover 74 which serves as a ground potential, it is easy to connect to the outside ground potential. The back cover 98 is simply connected electrically to the shield cover 74 just by pressing onto the shield cover 74 against the elastic force of the shield cover 74. In order to electrically connect the shield cover 74 and the back cover 98 simply as such, at least, one of the shield cover 74 and the back cover 98 may be formed with a material having an elasticity so as to press the back cover 98 onto the shield cover 74 against its elastic force.

Figure 22:
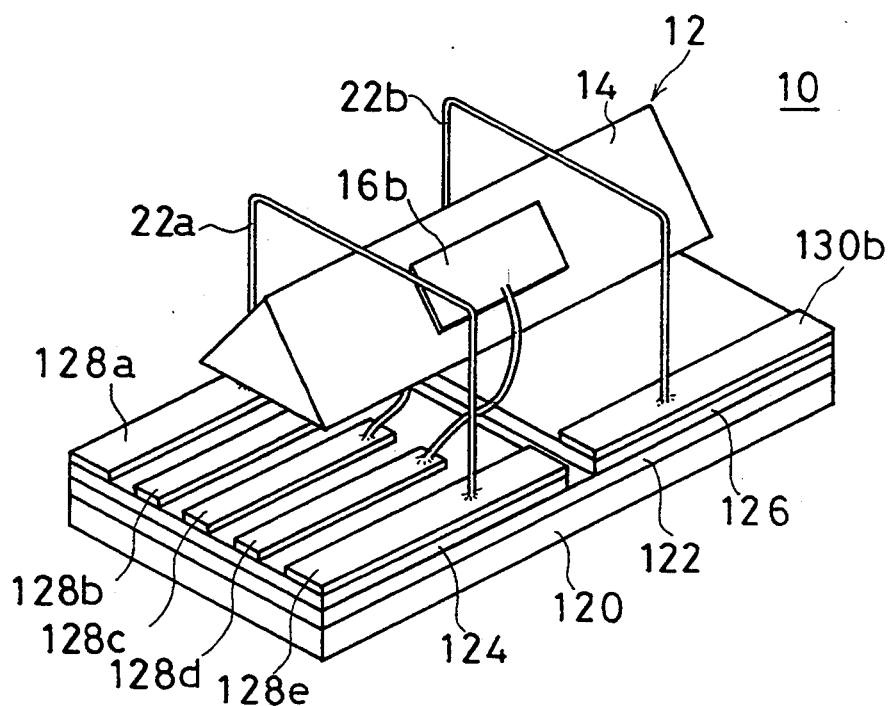
FIG. 22 is a perspective view showing another embodiment of the present invention.
Figure 23:
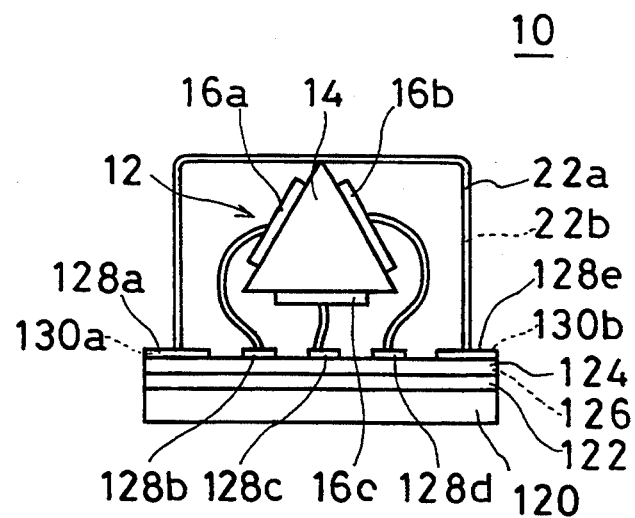
FIG. 23 is a side view of the embodiment shown in FIG. 22.
Figure 24:
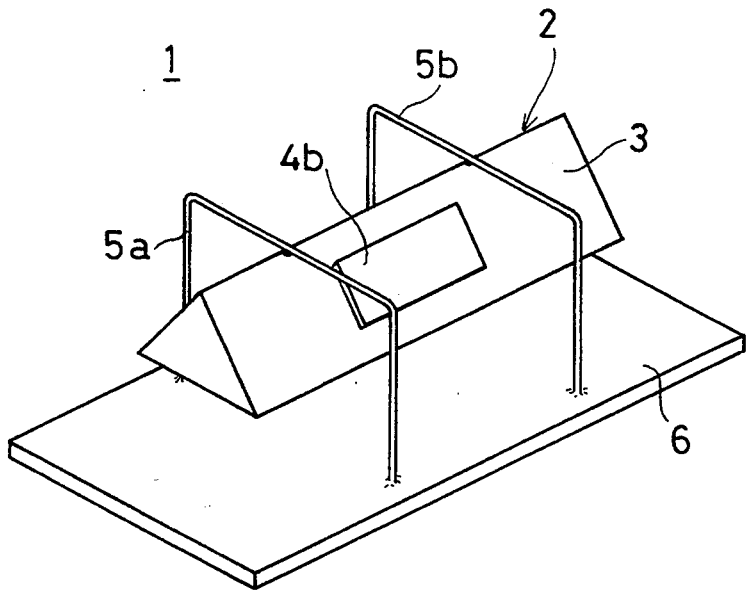
FIG. 24 is a perspective view showing an example of a conventional vibratory gyroscope which is a background of the present invention.
Figure 25:
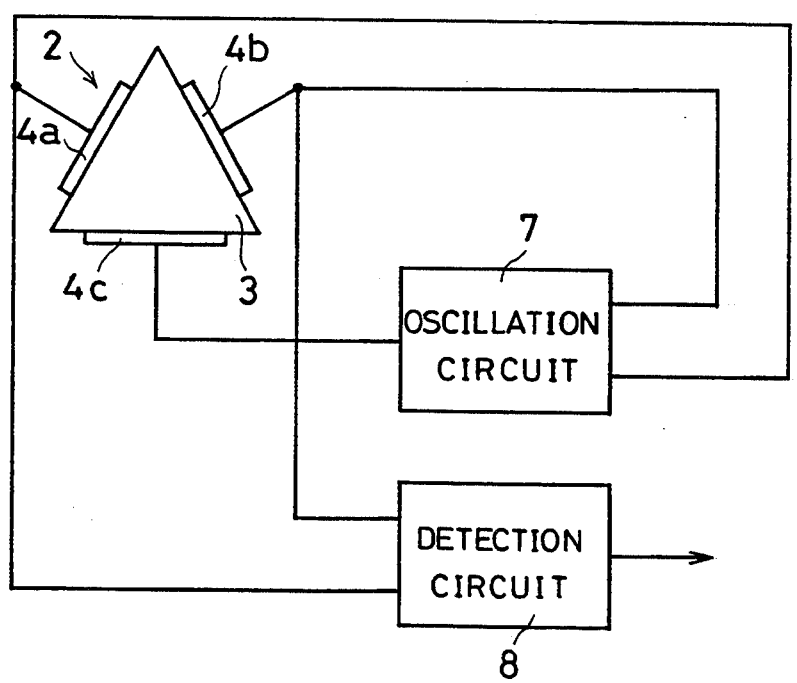
FIG. 25 is a circuit diagram of the vibratory gyroscope shown in FIG. 24.

FIG. 22 is a perspective view showing another embodiment of the present invention, and FIG. 23 is a side view thereof. The vibratory gyroscope 10 comprises a vibrator 12 (a vibrating body 14 and piezoelectric elements 16a to 16c) and supporting members 22a and 22b which are similar to the embodiment shown in FIG. 1. Furthermore, the vibratory gyroscope 10 comprises a supporting stand 120 consisting of a material such as metal, ceramics or the like. To one surface of the supporting stand 120, a buffer material 122 consisting of an elastic material such as rubber, sponge or the like is bonded.

To one surface of the buffer material 122, two boards 124 and 126 which are divided in its longitudinal direction are bonded. On one surface of the board 124, five electrodes 128a, 128b, 128c, 128d and 128e are formed in a spaced relationship in its lateral direction. On one surface of the other board 126, electrodes 130a and 130b are formed at opposite ends in its lateral direction.

To the electrodes 128a and 128e on one board 124, opposite ends of the supporting member 22a are secured by means of soldering, welding or the like. Similarly, opposite ends of the other supporting member 22b are respectively secured to the electrodes 130a and 130b on the other board 126. In this case, the supporting members 22a and 22b support the vibrating body 14 and also serve as grounding wires. Meanwhile, to the electrodes 128b, 128d and 128c on the board 124, the piezoelectric elements 16a, 16b and 16c are electrically connected respectively by means of, for example, the lead wires.

In the vibratory gyroscope 10, when a driving signal is applied to the electrodes 128b and 128d on the board 124 or the piezoelectric elements 16a and 16b, or to the electrode 128c or the piezoelectric element 16c, the vibrating body 14 bends and vibrates. In this case, the vibrating body 14 bends and vibrates in a direction orthogonal to the case whereon the piezoelectric element 16c is formed. When rotating about an axial direction of the vibrating body 14 in this state, the vibrating direction changes due to a Coriolis force. Voltages are generated in the piezoelectric elements 16a and 16c responsive thereto. Thus, when the voltage difference of the piezoelectric elements 16a and 16b is measured, a rotational angular velocity applied to the vibratory gyroscope 10 can be measured.

In this vibratory gyroscope 10, since an elastic material having a large strength is used as a material of the inner portions 23a of the multi-layer structure supporting members 22a and 23b, the supporting members 22a and 22b can be made finer. Thus vibration of the vibrating body 14 never leaks from the supporting members 22a and 22b, or an outside vibration is hardly transmitted to the vibrating body 14 through the supporting members 22a and 22b. Since the material of the inner portions 23a of the supporting members 22a and 22b deforms elastically, it does not hinder the vibration of the vibrating body 14. Hence, the vibration state of the vibratory gyroscope 10 as well as characteristics are stabilized.

Furthermore, since a material having a good solderability and weldability is used as a material of the outer portions 23b of the supporting members 22 and 22b, connection with the vibrating body 14 and connection with the electrodes 128a, 128e and 130a, 130b are effected reliably by means of soldering and welding.

In the vibratory gyroscope 10 of this embodiment, though the supporting members 22a and 22b bend in opposite directions with each other in a longitudinal direction of the vibrating body 14, at the same time, the boards 124 and 126 which are divided also displace separately. Hence, the supporting members 22a and 22b do not interfere one another, and the vibration of the vibrating body 14 is not suppressed by the supporting members 22a and 22b. Thus, a stable vibration attitude of the vibrating body 14 can be secured.

In the above-mentioned embodiments, though the piezoelectric elements are respectively formed on three side faces of the vibrating body 14, the driving and detecting piezoelectric elements may be respectively formed only on two side faces of the vibrating body 14.

The vibrating body 14 may also by formed into a polygonal prism shape such as a quadrangular prism shape besides the triangular prism shape. In this case, the piezoelectric elements may just be formed on two or more side faces of the vibrating body.

It will be apparent from the foregoing that, while the present invention has been described in detail and illustrated, these are only particular illustrations and examples, and . the invention is not limited to these. The spirit and scope of the invention is limited only by the appended claims.

We claim:

1. A vibratory gyroscope comprising:
   a prism-shaped vibrating body;
   a plurality of piezoelectric elements formed on the side faces of said vibrating body; and
   a supporting member connected to said vibrating body, said supporting member having a multi-layer structure and fixed in a vicinity of nodal points of said vibrating body,
   an inside portion of said supporting member being formed by an elastic material, and an outside portion surrounding said inside portion being formed by a solderable material.

2. A vibratory gyroscope according to claim 1, further comprising
   a shield member consisting of a magnetic material provided around said vibrating body.

3. A vibratory gyroscope according to claim 2, which further comprises a heater disposed in the vicinity of said vibrating body.

4. A vibratory gyroscope according to claim 3, wherein said heater includes a positive temperature coefficient element.

5. A vibratory gyroscope according to claim 3, which further comprises a material, which acts as a cushion, disposed around said vibrating body.

6. A vibratory gyroscope according to claim 5, wherein said material is formed with a material which is foamed such that respective cells of said foam do not cohere to each other.

7. A vibratory gyroscope according to claim 2, which further comprises an oscillation circuit for driving said vibrating body, and
   a shield cover consisting of a magnetic material and provided so as to cover said oscillation circuit.

8. A vibratory gyroscope according to claim 2, which further comprises a shield cover which serves as a ground potential, and
   a back cover connected electrically to said shield cover,
   at least one of a) said shield cover and b) said back cover being formed by a material having an elasticity, and said back cover being pressed onto said shield cover against an elastic force of said material.

9. A vibratory gyroscope comprising:
   a vibrator;
   a supporting member for supporting said vibrator;
   a first protective member disposed in a vicinity of said vibrator; and
   a second protective member disposed in a vicinity of said supporting member.

10. A vibratory gyroscope according to claim 9, which further comprises a circuit board provided with said vibrator on one side of said circuit board,
    an oscillation circuit provided on the other side said circuit board for driving said vibrator,
    a detection circuit provided on said other side of said circuit board for detecting displacement of said vibrator, and
    an intermediate board having terminals which extend through said circuit board,
    said vibrator, said oscillation circuit and said detection circuit being electrically connected through said terminals of said intermediate board.

11. A vibratory gyroscope according to claim 9, wherein said second protective member prevents said supporting member from lateral displacement of the vibrator.

12. A vibratory gyroscope according to claim 9, wherein said second protective member is provided on an inner side of said supporting member.

13. A vibratory gyroscope according to claim 9, wherein said first protective member prevents said vibrator from displacement in a longitudinal direction thereof.

14. A vibratory gyroscope according to claim 9, wherein said first protective member is disposed on opposite ends of said vibrator in a longitudinal direction of the vibrator.

* * * * *